United States Patent
Tokai

(10) Patent No.: US 9,178,428 B2
(45) Date of Patent: Nov. 3, 2015

(54) STEP-DOWN SWITCHING CIRCUIT

(71) Applicant: KABUSHIKI KAISHA TOSHIBA, Minato-ku (JP)

(72) Inventor: Yoichi Tokai, Tokyo (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 238 days.

(21) Appl. No.: 14/013,857

(22) Filed: Aug. 29, 2013

(65) Prior Publication Data

US 2014/0266095 A1    Sep. 18, 2014

(30) Foreign Application Priority Data

Mar. 13, 2013 (JP) ................................. 2013-050619

(51) Int. Cl.
H02M 3/158    (2006.01)

(52) U.S. Cl.
CPC .......... H02M 3/1588 (2013.01); Y02B 70/1466 (2013.01)

(58) Field of Classification Search
CPC ............................. H02M 3/1588; H02M 3/158
USPC .......................... 323/271, 282, 284, 285, 351
See application file for complete search history.

(56) References Cited

U.S. PATENT DOCUMENTS

| | | | |
|---|---|---|---|
| 4,929,882 A | 5/1990 | Szepesi | |
| 7,202,642 B1 | 4/2007 | Chen et al. | |
| 7,868,598 B2 * | 1/2011 | Ishino | 323/282 |
| 7,872,458 B2 | 1/2011 | Ishii | |
| 8,093,878 B2 * | 1/2012 | Goto et al. | 323/285 |
| 8,138,739 B1 * | 3/2012 | Eirea et al. | 323/286 |
| 8,368,365 B2 * | 2/2013 | Canfield et al. | 323/259 |
| 8,659,274 B2 * | 2/2014 | Hane | 323/271 |
| 2006/0164055 A1 * | 7/2006 | Hata et al. | 323/282 |
| 2007/0090821 A1 * | 4/2007 | Imai et al. | 323/284 |
| 2009/0102444 A1 * | 4/2009 | Nonaka | 323/282 |
| 2009/0153124 A1 | 6/2009 | Ishii | |
| 2009/0201000 A1 * | 8/2009 | Kojima et al. | 323/282 |
| 2010/0134081 A1 * | 6/2010 | Oki | 323/282 |
| 2010/0181977 A1 * | 7/2010 | Sohma | 323/282 |
| 2011/0101932 A1 | 5/2011 | Nakazono | |

(Continued)

FOREIGN PATENT DOCUMENTS

| | | |
|---|---|---|
| JP | 2008-228461 A | 9/2008 |
| JP | 2009-14811 A | 7/2009 |

(Continued)

OTHER PUBLICATIONS

Japanese Office Action issued on May 8, 2015 in corresponding Japanese Application No. 2013-050619, along with English translation thereof.

*Primary Examiner* — Gary L Laxton
*Assistant Examiner* — Kyle J Moody
(74) *Attorney, Agent, or Firm* — David M. Tennant

(57) ABSTRACT

The step-down switching circuit includes an amplifier capacitor having a first end connected to the feedback terminal and a second end connected to a second input of the amplifier. The step-down switching circuit includes a first resistor having a first end connected to the first end of the amplifier capacitor. The step-down switching circuit includes a second resistor having a first end connected to a second end of the first resistor and a second end connected to an output of the amplifier. The step-down switching circuit includes a third resistor having a first end connected to the second end of the first resistor and a second end connected to the second end of the amplifier capacitor.

20 Claims, 5 Drawing Sheets

(56) References Cited

U.S. PATENT DOCUMENTS

2011/0285370 A1* 11/2011 Gritti ............................ 323/282
2015/0022165 A1* 1/2015 Sato ............................. 323/271

FOREIGN PATENT DOCUMENTS

| JP | 2011-087442 A | 4/2011 |
| JP | 2011-101479 A | 5/2011 |

* cited by examiner

STEP-DOWN SWITCHING CIRCUIT

CROSS-REFERENCE TO RELATED APPLICATION

This application is based upon and claims the benefit of priority from the prior Japanese Patent Application No. 2013-050619, filed on Mar. 13, 2013, the entire contents of which are incorporated herein by reference.

BACKGROUND

1. Field

Embodiments described herein relate generally to a step-down switching circuit.

2. Background Art

Conventionally, many electronic components have been developed to achieve electronic equipment. Power supplies for maintaining and efficiently utilizing the performance of electronic components vary in voltage accuracy and noise resistance and thus need to be selected from various alternatives and combined before use.

DETAILED DESCRIPTION

A step-down switching circuit according to an embodiment includes a first switch element having a first end connected to an input terminal supplied with a power supply voltage and a second end connected to a switch terminal connectable to an inductor between the switch terminal and a feedback terminal. The step-down switching circuit includes a second switch element having a first end connected to the second end of the switch terminal and a second end connected to a ground terminal. The step-down switching circuit includes an amplifier having a first input supplied with a reference voltage. The step-down switching circuit includes an amplifier capacitor having a first end connected to the feedback terminal and a second end connected to a second input of the amplifier. The step-down switching circuit includes a first resistor having a first end connected to the first end of the amplifier capacitor. The step-down switching circuit includes a second resistor having a first end connected to a second end of the first resistor and a second end connected to an output of the amplifier. The step-down switching circuit includes a third resistor having a first end connected to the second end of the first resistor and a second end connected to the second end of the amplifier capacitor. The step-down switching circuit includes an oscillator that outputs a voltage of a triangular wave. The step-down switching circuit includes a comparator that receives the voltage of the triangular wave and a voltage of an amplifier signal from the amplifier and outputs a comparison signal of the voltages. The step-down switching circuit includes a control circuit that complementarily turns on/off the first switch element and the second switch element based on the comparison signal outputted from the comparator.

In a conventional step-down switching circuit, a coil current that is an integral of a switching waveform is smoothed into an integrated capacitor voltage. Thus, the two integrals cause lag modules in a feedback system with respect to fluctuations in consumed current, leading to a smaller phase margin.

Hence, if a feedback control system further contains integral elements in addition to the lag modules, a high frequency gain cannot be increased for stabilization of an output voltage. In this case, a smoothing capacitor having a larger capacitance is necessary for reducing an output voltage overshoot or undershoot caused by load fluctuations with a small phase margin. This makes it difficult to reduce the sizes and weights of conventional step-down switching circuits.

Embodiments of the present invention will describe step-down switching circuits that can improve load response at higher speeds.

The embodiments will be described below with reference to the accompanying drawings.

First Embodiment

Figure 1:
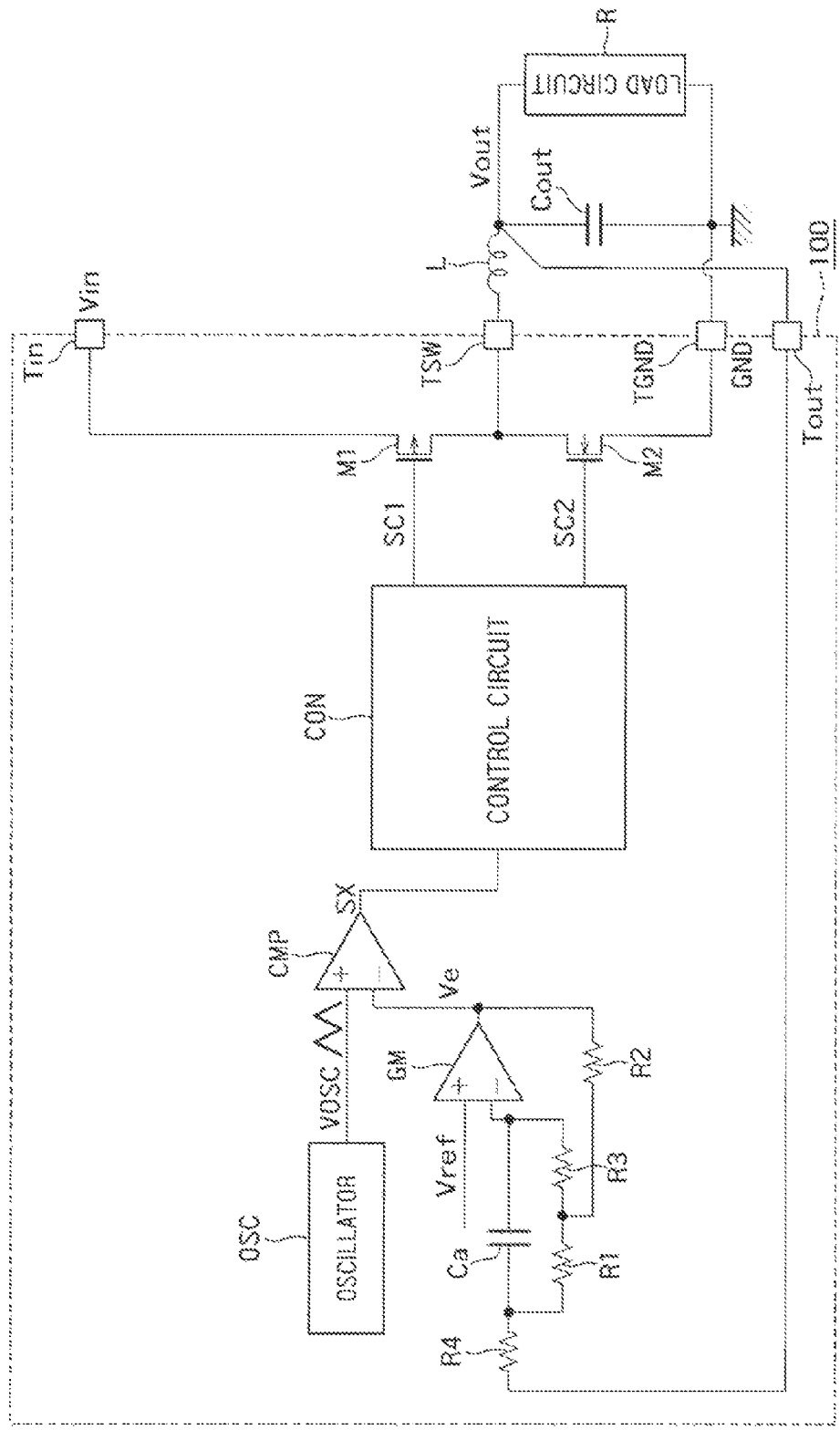
FIG. 1 is a diagram showing an example of the configuration of a step-down switching circuit 100 according to a first embodiment.
Figure 2:
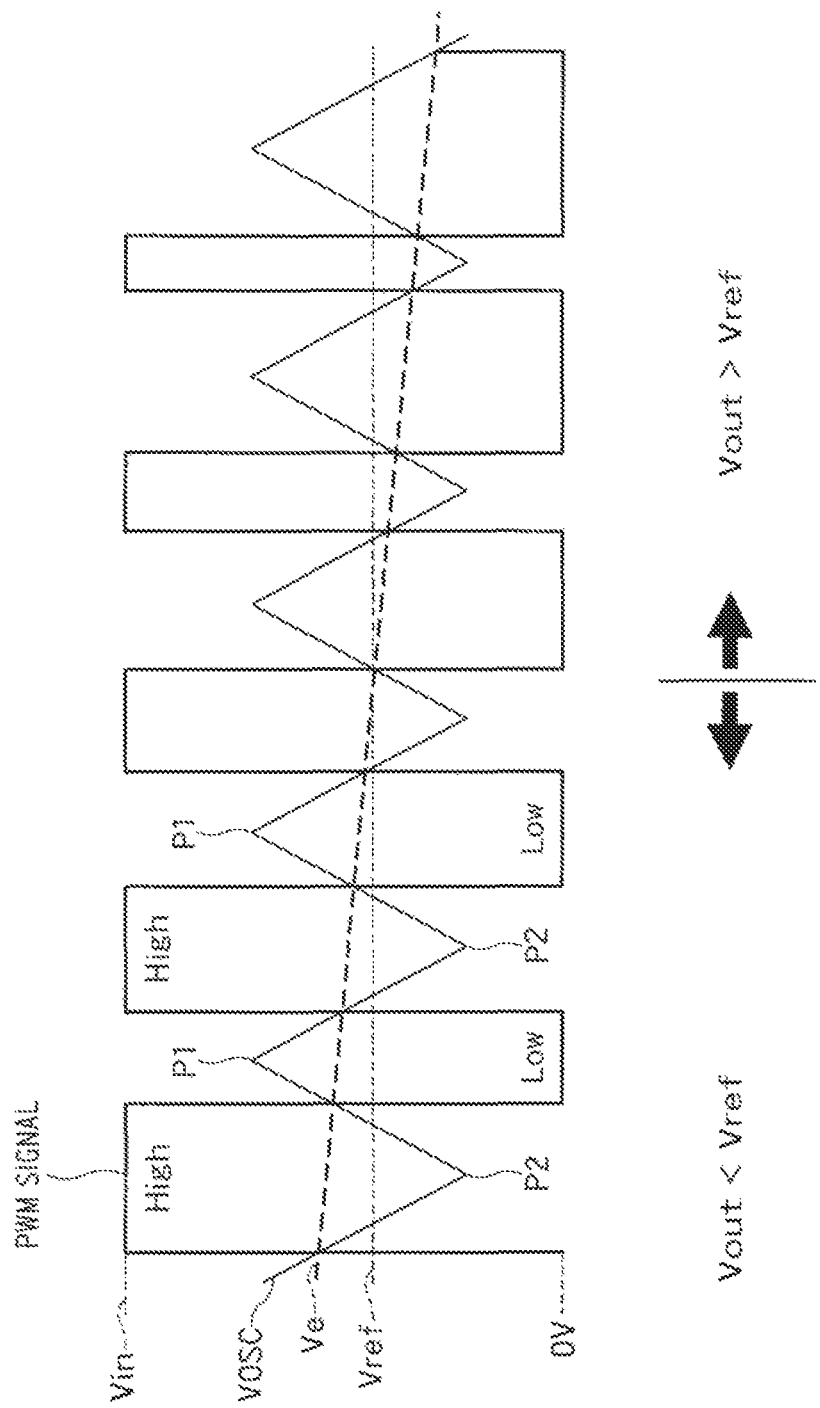
FIG. 2 is a diagram showing an example of the operating waveforms of the step-down switching circuit 100 illustrated in FIG. 1.

FIG. 1 illustrates an example of the configuration of a step-down switching circuit 100 according to a first embodiment. FIG. 2 shows an example of the operating waveforms of the step-down switching circuit 100 illustrated in FIG. 1.

As shown in FIG. 1, the step-down switching circuit 100 includes a first switch element M1, a second switch element M2, a gm amplifier GM, an amplifier capacitor Ca, a first resistor R1, a second resistor R2, a third resistor R3, a fourth resistor R4, an oscillator OSC, a comparator CMP, and a control circuit CON.

An inductor L and a smoothing capacitor Cout in FIG. 1 are the external elements of the step-down switching circuit 100. The step-down switching circuit 100 may include the inductor L and the smoothing capacitor Cout.

Furthermore, a load circuit R is connected between a feedback terminal Tout and a ground terminal TGND.

The first switch element M1 has one end connected to an input terminal Tin that receives a power supply voltage (input voltage) Vin and the other end connected to a switch terminal TSW. The inductor L is connected between the switch terminal TSW and the feedback terminal Tout.

As shown in FIG. 1, for example, the first switch element M1 is a pMOS transistor. In this case, the source of the first switch element M1 is connected to the input terminal, the drain of the first switch element M1 is connected to the switch terminal TSW, and the gate of the first switch element M1 receives a first control signal SC1 outputted from the control circuit CON. In the case where the first switch element M1 is an nMOS transistor, the drain of the first switch element M1 is connected to the input terminal, the source of the first switch element M1 is connected to the switch terminal TSW, and the gate of the first switch element M1 receives the first control signal SC1 outputted from the control circuit CON. If the switch element M1 is an nMOS transistor, the polarity of the control signal SC1 is reversed from that of a pMOS transistor.

The second switch element M2 has one end connected to the switch terminal TSW and the other end connected to the ground terminal TGND. The ground terminal TGND receives a ground voltage GND and is connected to the smoothing capacitor Cout that is connected between the ground terminal TGND and the feedback terminal Tout.

As shown in FIG. 1, for example, the second switch element M2 is an NMOS transistor. The drain of the second switch element M2 is connected to the switch terminal TSW, the source of the second switch element M2 is connected to the ground terminal TGND, and the gate of the second switch element M2 receives a second control signal SC2 outputted from the control circuit CON.

The gm amplifier GM has a first input that receives a reference voltage Vref.

The amplifier capacitor Ca has one end connected to the feedback terminal Tout via the fourth resistor R4 and the other end connected to the second input of the gm amplifier GM.

The first resistor R1 has one end connected to one end of the amplifier capacitor Ca.

The second resistor R2 has one end connected to the other end of the first resistor R1 and the other end connected to the output of the gm amplifier GM.

The third resistor R3 has one end connected to the other end of the first resistor R1 and the other end connected to the other end of the amplifier capacitor Ca.

The fourth resistor R4 is connected between one end of the amplifier capacitor Ca and the feedback terminal Tout.

The oscillator OSC generates and outputs a triangular wave (a voltage VOSC in FIG. 2).

For example, the oscillator OSC generates a triangular wave based on the power supply voltage Vin.

The amplitude of the triangular wave is set proportionately with, for example, the power supply voltage Vin. The amplitude of the triangular wave is particularly set at a half of the power supply voltage Vin.

A top point P1 of the triangular wave is higher than the reference voltage Vref while a bottom point P2 of the triangular wave is set lower than the reference voltage Vref.

A first ratio (A:B) of a second difference (B) between an output voltage Vout and the bottom point P2 to a first difference (A) between the top point P1 and the output voltage Vout is set as large as a second ratio (Vin−Vout:Vout) of a fourth difference (Vout−GND(0)) between the output voltage Vout and the ground voltage GND to a third difference (Vin−Vout) between the power supply voltage Vin and the output voltage Vout (FIG. 2). At this point, the output voltage Vout is substantially equal to the reference voltage Vref under the feedback control of the step-down switching circuit 100.

An example of a method of producing a triangular wave by means of the oscillator OSC will be described below.

For example, an increasing slope of an equivalent triangular wave indicates a voltage generated on a capacitor (not shown) by passing a current proportionate to the power supply voltage Vin through the discharged capacitor on the ground side. When the voltage reaches an output set voltage, a current proportionate to the power supply voltage Vin is passed from the capacitor charged on a power supply for a decreasing slope. A voltage generated on the capacitor for a decreasing slope is a decreasing slope voltage.

When a decreasing slope crosses an increasing slope in a voltage range higher than the output set voltage, the capacitor for an increasing slope is grounded to start discharging. The discharging is continued until the decreasing slope reaches an output voltage set value. After that, a proportional current is supplied to the capacitor again.

When the capacitor for a decreasing slope is charged to VDD, an increasing slope crosses a decreasing slope again at the output set voltage or lower. When the increasing slope reaches the output set voltage, the charging is completed and then discharging is started with a current proportionate to the power supply voltage Vin.

After that, these operations are repeated. Thus, an increasing slope from an intersection below the output set voltage to an intersection above the output set voltage is combined with a decreasing slope from an intersection above the output set voltage to an intersection below the output set voltage to generate an equivalent triangular wave. The triangular wave voltage VOSC from the oscillator OSC is supplied to the first input of the comparator CMP, and an output voltage Ve from the gm amplifier GM is supplied to the second input of the comparator CMP, allowing a comparison signal SX to be outputted based on these inputs. In the example of FIG. 1, the first input of the comparator CMP is the non-inverting input terminal of the comparator CMP while the second input of the comparator CMP is the inverting input terminal of the comparator CMP. Moreover, in the example of FIG. 1, the first input of the gm amplifier GM is the non-inverting input terminal of the gm amplifier GM while the second input of the gm amplifier GM is the inverting input terminal of the gm amplifier GM.

The first input of the gm amplifier GM receives the reference voltage Vref while the second input of the gm amplifier GM receives a voltage based on the output voltage Vout through the resistors R1 to R4 and the capacitor Ca.

If a voltage inputted to the second input of the gm amplifier GM based on the output voltage Vout is larger than the reference voltage Vref, the output voltage Ve from the gm amplifier GM is smaller than the reference voltage Vref. If a voltage inputted to the second input of the gm amplifier GM based on the output voltage Vout is smaller than the reference voltage Vref, an output voltage Ve from the gm amplifier GM is larger than the reference voltage Vref.

In the case where the output voltage Ve of the gm amplifier GM is in phase with the voltage inputted to the second input of the gm amplifier GM, the first input of the gm amplifier GM may be an inverting input terminal and the second input of the gm amplifier GM may be a non-inverting input terminal.

In the case where the output of the gm amplifier is in phase with the second input or logic is inverted an odd number of times in the control circuit CON, the first input of the comparator CMP may be the inverting input terminal of the comparator CMP and the second input of the comparator CMP may be the non-inverting input terminal of the comparator CMP.

The control circuit CON performs pulse width modulation (PWM) control on the first switch element M1 and the second switch element M2 in response to the control signals SC1 and SC2 based on the comparison signal SX outputted from the comparator CMP.

In other words, the control circuit CON controls the first switch element M1 in response to the first control signal SC1 based on the comparison signal SX and controls the second switch element M2 in response to the second control signal SC2.

For example, the control circuit CON exclusively turns on and off the first switch element M1 and the second switch element M2 as follows: if it is decided that the triangular wave voltage VOSC is equal to or higher than the output voltage Ve from the gm amplifier GM based on the comparison signal SX, the control circuit CON turns off the first switch element M1 and turns on the second switch element M2.

If it is decided that the triangular wave voltage VOSC is lower than the output voltage Ve from the gm amplifier GM based on the comparison signal SX, the control circuit CON turns on the first switch element M1 and turns off the second switch element M2.

This mechanism causes the control circuit CON to reduce the on duty of the first switch element M1 and increase the on duty of the second switch element M2 as the output voltage Ve from the gm amplifier GM decreases.

Furthermore, the control circuit CON increases the on duty of the first switch element M1 and reduces the on duty of the second switch element M2 as the output voltage Ve from the gm amplifier GM increases.

As shown in FIG. 1, for the gm amplifier GM that determines the on duty of the first and second switch elements M1 and M2, a DC level is determined only by the resistors.

Considering the time derivative, Ve is expressed as the function of 's' approximately as follows:

$$Ve = Vref + $$
$$(Vref - Vout) \times R2\{1 + sCa(R1 + R3)\}/[R1 + R4\{1 + sCa(R1 + R3)\}] = $$
$$Vref + (Vref - Vout) \times \{R2/R1 + R2 \times sCa(R1 + R3)/R1\}/$$
$$\{1 + R4/R1 + R4 \times sCa(R1 + R3)/R1\}$$

For close loop stable system, it could be necessary a large value of sCa(R1+R3)/R1 that could be achieved by large Ca or large R3.

In many cases, increasing R3 needs smaller size growth of chip to achieve large sCa(R1+R3)/R1 than increasing size of Ca.

In the case where a load changes at a low speed, particularly in the case of 1>>sCa(R1+R3), the expression including a DC load (s=0) is expressed as follows:

$$Ve = Vref + (Vref - Vout) \times R2/(R1 + R4)$$

In this case, M1 has on duty "D1" as follows:

$$D1 = (2Ve - Vref)/Vin = \{(Vref - Vout) \times R2/(R1 + R4) + Vref\}/Vin$$

Moreover, on duty "D2" of M2 is determined by D2=1−D1 by means of the resistors.

In the case where a load changes at a high speed, particularly in the case of 1<<sCa(R1+R3), a ratio of a rate of change of duty to a rate of change of "Vout" is also determined by the resistors.

$$sVe = -sVout \times R2/R4$$

$$sD1 = -2sVout/Vin \times R2/R4$$

In a frequency band of s=jω, at a frequency around 1≈|jωCa(R1+R3)|, a phase with a gain R2{1+jωCa(R1+R3)}/[R1+R4{1+jωCa(R1+R3)}] leads to a phase advance of arc Tan(ωCa(R1+R3)R4/(R1+R4)).

In the case of R4=0, the gain has a proportional of R2{1+jωCa(R1+R3)}/R1 with respect to "ω". The phase advance is arc Tan(ωCa(R1+R3)), which approaches 90° as "ω" increases.

In the absence of the influence of noise superimposition, a phase capable of returning up to 90° is suitable for speedups. In many cases, this gain emphasizes high-frequency noise superimposing "Ve" and causes vertical intersection instead of horizontal slicing on a triangular wave. Since the duty may be incorrectly determined, it is recommended that R4 be a certain value such as R4>0.01 R2 or R4>0.03 R1.

In a step-down DCDC, L and Cout as an LC filter delay a phase by 180° at a frequency of 1/{2π√(LCout)} determined by external L and Cout. The frequency 1/{2πCa(R1+R3)} determined by Ca(R1+R3) is set close to the frequency 1/{2π√(LCout)}, achieving phase compensation with the phase advance.

Furthermore, a range with a positive phase advance is extended to a switching frequency, and the absolute value of a gain is set below 1 before the switching frequency, achieving a loop gain suitable for stable feedback.

In other words, the gm amplifier GM can obtain quick response, reducing an output voltage overshoot and an output voltage undershoot caused by load fluctuations.

This can reduce the smoothing capacitor for reducing the influence of load fluctuations.

The operating characteristics of the step-down switching circuit 100 in FIG. 1 will be described below.

As has been discussed, the control circuit CON performs PWM control on the first switch element M1 and the second switch element M2 in response to the control signals SC1 and SC2 based on the comparison signal SX outputted from the comparator CMP.

For example, if it is decided that the triangular wave voltage VOSC is equal to or higher than the output voltage Ve from the gm amplifier GM based on the comparison signal SX, the control circuit CON turns off the first switch element M1 and turns on the second switch element M2 (a period during which the PWM signal based on the comparison signal SX is at "Low" level in FIG. 2).

If it is decided that the triangular wave voltage VOSC is lower than the output voltage Ve from the gm amplifier GM based on the comparison signal SX, the control circuit CON turns on the first switch element M1 and turns off the second switch element M2 (a period during which the PWM signal based on the comparison signal SX is at "High" level in FIG. 2).

Moreover, as shown in FIG. 2, as the output voltage Ve from the gm amplifier GM decreases, the "High"-level duty ratio of the PWM signal is controlled to a smaller ratio (the "Low"-level duty ratio to a larger ratio).

In other words, as the output voltage Ve from the gm amplifier GM decreases, the control circuit CON reduces the on duty of the first switch element M1 and increases the on duty of the second switch element M2.

As shown in FIG. 2, as the output voltage Ve from the gm amplifier GM increases, the "High"-level duty ratio of the PWM signal is controlled to a larger ratio (the "Low"-level duty ratio to a smaller ratio).

In other words, if the output voltage Ve from the gm amplifier GM is lower than the reference voltage Vref, the control circuit CON increases the on duty of the first switch element M1 and reduces the on duty of the second switch element M2 as the output voltage Ve from the gm amplifier GM increases.

With these operations, the step-down switching circuit 100 outputs the output voltage Vout with a reduced output voltage overshoot or undershoot caused by load fluctuations.

As has been discussed, for the gm amplifier GM that determines the on duty of the first and second switch elements M1 and M2, a DC level is determined only by the resistors.

The response of the gm amplifier GM can be adjusted by adjusting, in particular, the resistance value of the third resistor R3. For example, the response speed of the gm amplifier GM can be improved by increasing the resistance value of the third resistor R3.

In other words, the gm amplifier GM can obtain quick response, reducing an output voltage overshoot and an output voltage undershoot caused by load fluctuations.

This can reduce the smoothing capacitor for reducing the influence of load fluctuations.

As has been discussed, the step-down switching circuit according to the first embodiment can improve load response with higher speeds.

Second Embodiment

Figure 3:
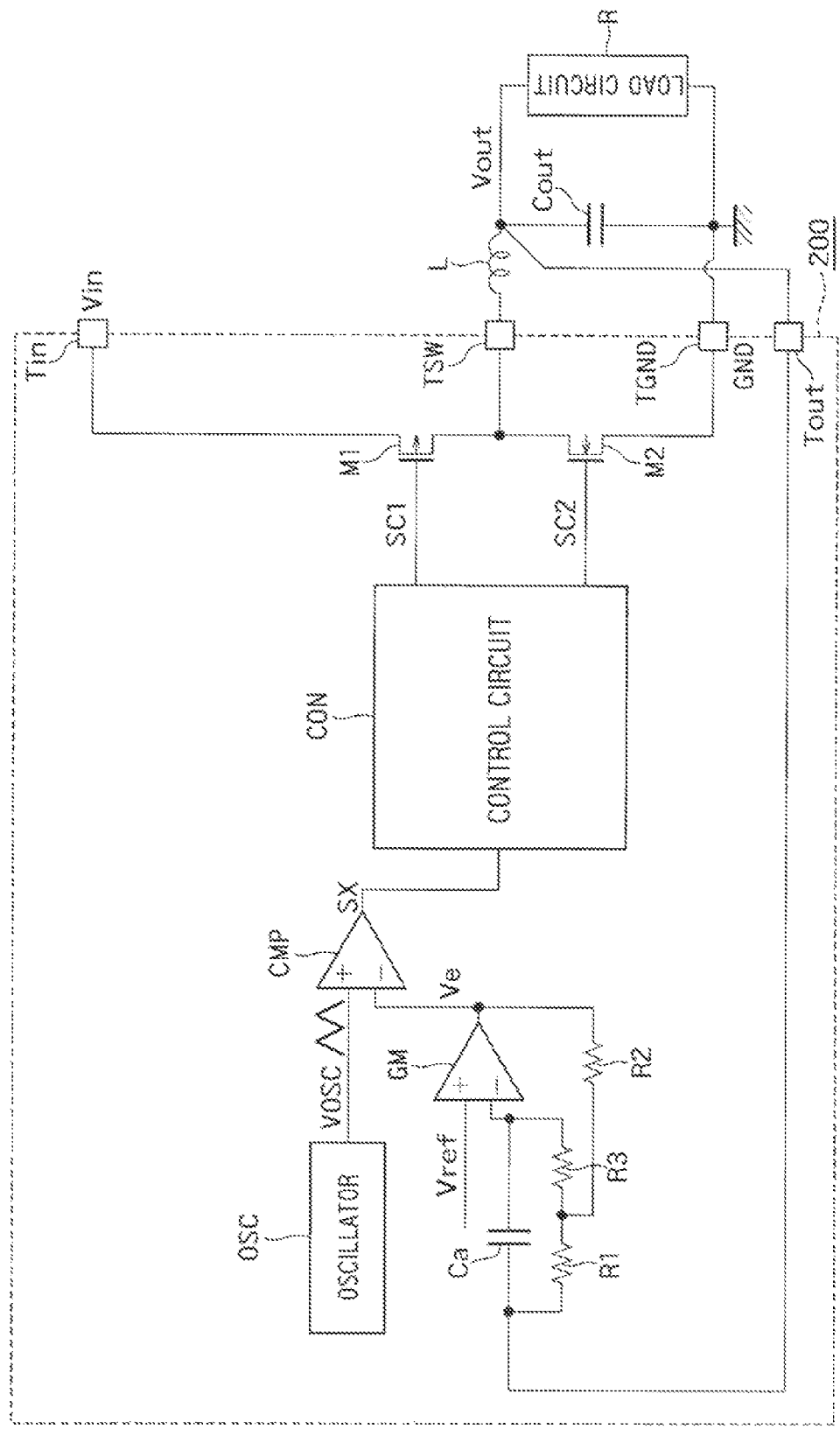
FIG. 3 is a diagram showing an example of the configuration of a step-down switching circuit 200 according to a second embodiment.

FIG. 3 shows an example of the configuration of a step-down switching circuit 200 according to a second embodiment. In FIG. 3, the same reference numerals as in FIG. 1 indicate the same configurations as those of the first embodiment.

As shown in FIG. 3, the step-down switching circuit 200 includes, for example, a first switch element M1, a second switch element M2, a gm amplifier GM, an amplifier capacitor Ca, a first resistor R1, a second resistor R2, a third resistor R3, an oscillator OSC, a comparator CMP, and a control circuit CON.

In the step-down switching circuit 200, the amplifier capacitor Ca has one end directly connected to a feedback terminal Tout.

The step-down switching circuit 200 is different from that of the first embodiment in that the fourth resistor R4 is omitted. The omission of the fourth resistor R4 deteriorates noise characteristics but can reduce a circuit area.

Other configurations of the step-down switching circuit 200 are identical to those of the step-down switching circuit 100 according to the first embodiment in FIG. 1.

The step-down switching circuit 200 according to the second embodiment operates like the step-down switching circuit 100 according to the first embodiment.

Specifically, the step-down switching circuit according to the second embodiment can improve load response with higher speeds as in the first embodiment.

Third Embodiment

In the first embodiment, the first resistor R1, the second resistor R2, and the third resistor R3 of the step-down switching circuit 100 are connected in a Y configuration. The connection in the Y configuration may be replaced with a connection in a Δ configuration as an equivalent circuit.

In a third embodiment, an example of first to third resistors connected in a Δ configuration will be described. The characteristics of a step-down switching circuit replaced with the Δ configuration are similar to those of the Y configuration.

Figure 4:
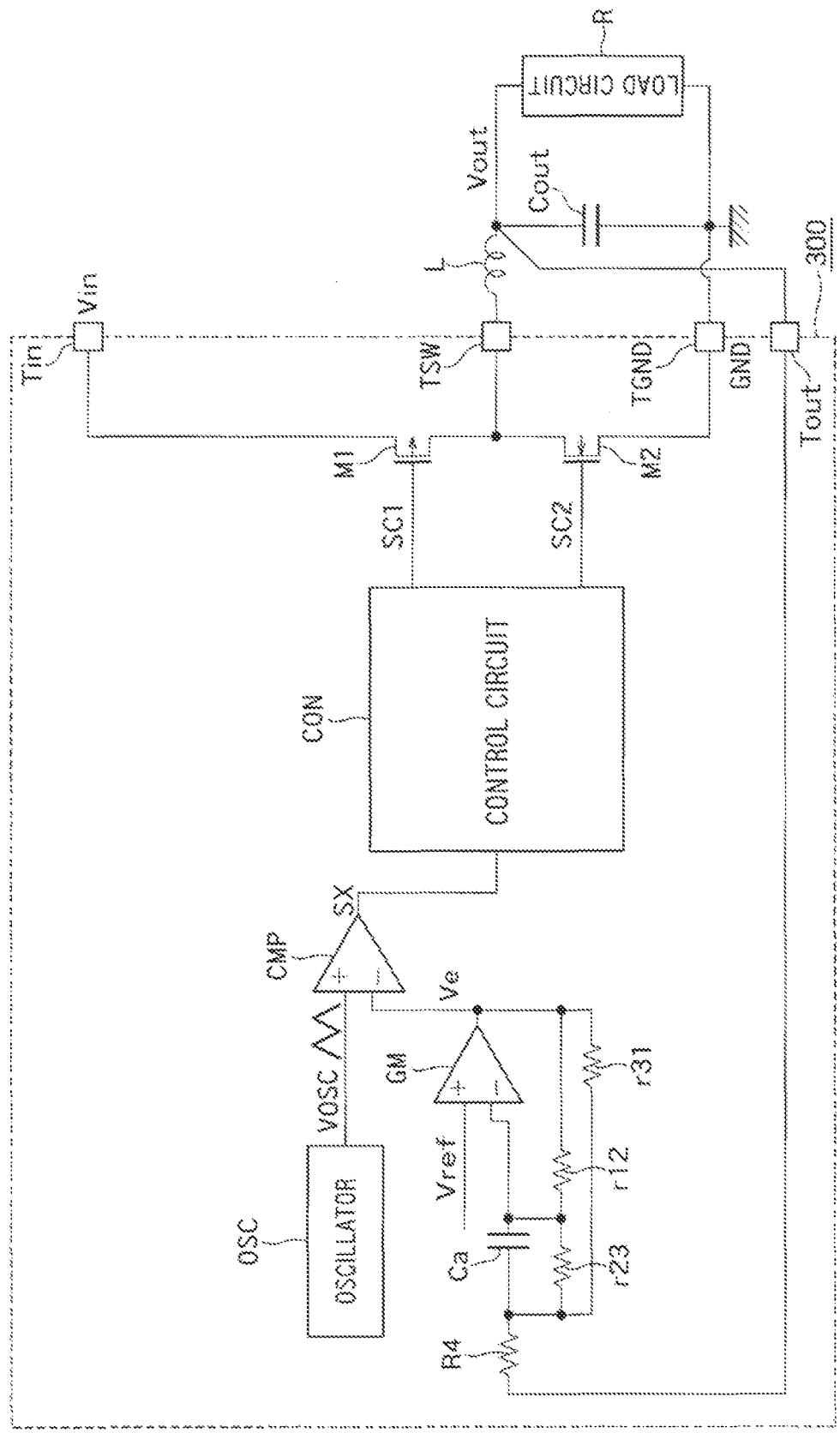
FIG. 4 is a diagram showing an example of the configuration of a step-down switching circuit 300 according to the third embodiment.

FIG. 4 shows an example of the configuration of a step-down switching circuit 300 according to the third embodiment. In FIG. 4, the same reference numerals as in FIG. 1 indicate the same configurations as those of the first embodiment.

As shown in FIG. 4, the step-down switching circuit 300 includes, for example, a first switch element M1, a second switch element M2, a gm amplifier GM, an amplifier capacitor Ca, a first resistor r12, a second resistor r23, a third resistor r31, a forth resistor R4, an oscillator OSC, a comparator CMP, and a control circuit CON.

In this configuration, the amplifier capacitor Ca has one end connected to a feedback terminal Tout and the other end connected to the second input of the gm amplifier GM.

The first resistor r12 has one end connected to the other end of the amplifier capacitor Ca and the other end connected to the output of the gm amplifier GM.

The second resistor r23 has one end connected to one end of the amplifier capacitor Ca and the other end connected to the other end of the amplifier capacitor Ca.

The third resistor r31 has one end connected to one end of the second resistor r23 and the other end connected to the other end of the first resistor r12.

The fourth resistor R4 is connected between one end of the amplifier capacitor Ca and the feedback terminal Tout.

As expressed by equations below, equivalent circuits are formed by the first resistor R1, the second resistor R2, and the third resistor R3 connected in a Y configuration and the first resistor r12, the second resistor r23, and the third resistor r31 connected in a Δ configuration.

$$r_{23} = \frac{R_1 R_2 + R_2 R_3 + R_3 R_1}{R_1}$$

$$r_{31} = \frac{R_1 R_2 + R_2 R_3 + R_3 R_1}{R_2}$$

$$r_{12} = \frac{R_1 R_2 + R_2 R_3 + R_3 R_1}{R_3}$$

"ΔVT" denotes a difference between a reference voltage Vref and a voltage closer to the reference voltage Vref at a top point or a bottom point of a triangular wave. In this case, an output ripple "ΔVR" is expressed by the following expression ("Vo" denotes an output voltage while "Vi" denotes an input voltage). "ESR" in the expression denotes a parasitic resistance connected in series with the capacitance component of the smoothing capacitor Cout.

$$\Delta VR = \frac{1}{8LC} \frac{Vo(Vi - Vo)}{Vi} + \frac{Vi}{2L} C \cdot ESR^2$$

In order to improve load response in the expression of the output ripple "ΔVR", a difference "ΔVT" desirably has the relationship of the following expression:

$$\Delta VT \geq \Delta VR \frac{R_3}{2 \cdot R_1}$$

$$\Delta VT \geq \Delta VR \frac{r_{12}}{2 \cdot r_{23}}$$

Other configurations of the step-down switching circuit 300 are identical to those of the step-down switching circuit 100 according to the first embodiment in FIG. 1.

The step-down switching circuit 300 according to the third embodiment operates like the step-down switching circuit 100 according to the first embodiment.

Specifically, the step-down switching circuit according to the third embodiment can improve load response with higher speeds as in the first embodiment.

Fourth Embodiment

Figure 5:
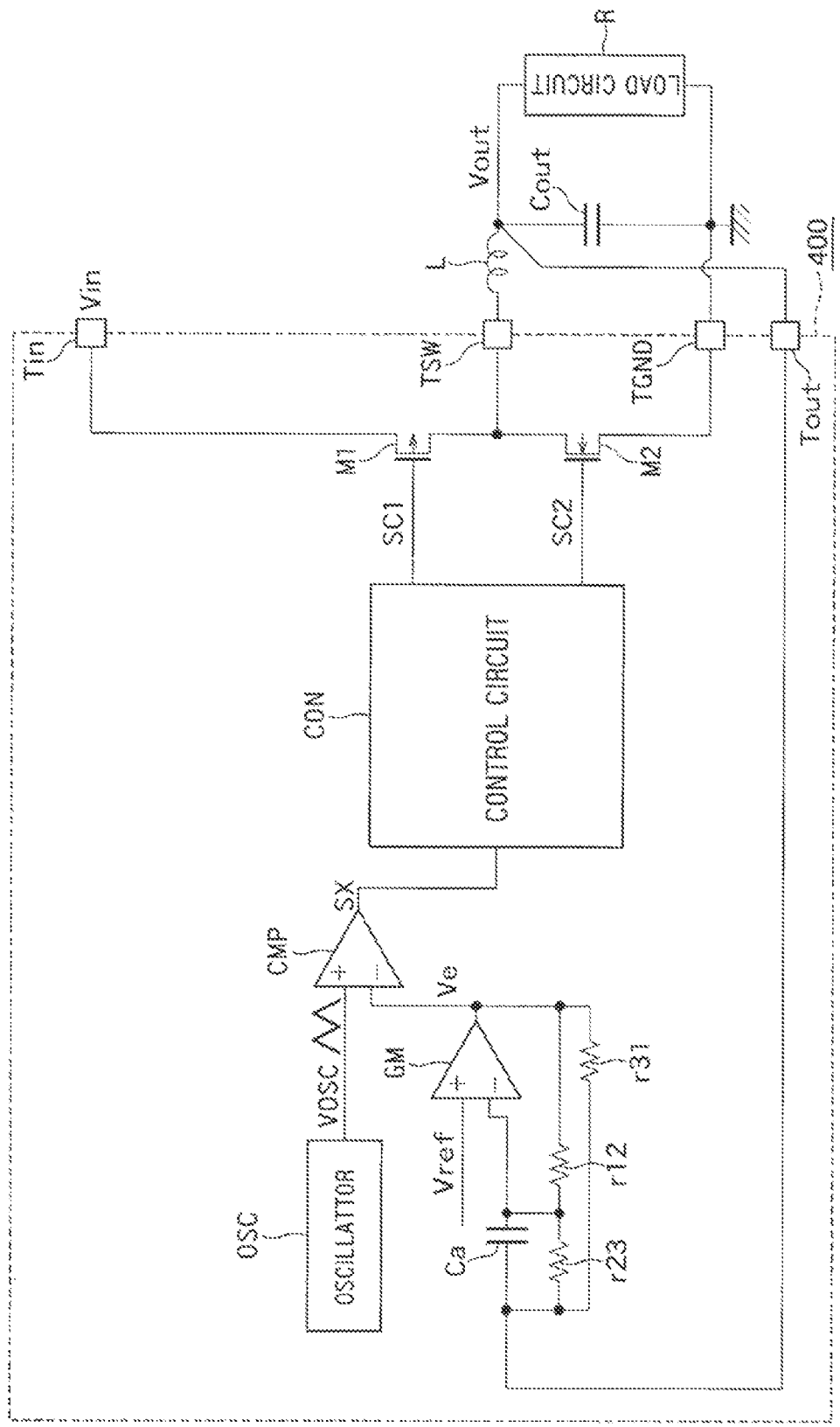
FIG. 5 is a diagram showing an example of the configuration of a step-down switching circuit 400 according to a fourth embodiment.

FIG. 5 shows an example of the configuration of a step-down switching circuit 400 according to a fourth embodiment. In FIG. 5, the same reference numerals as in FIG. 4 indicate the same configurations as those of the third embodiment.

As shown in FIG. 5, the step-down switching circuit 400 includes, for example, a first switch element M1, a second switch element M2, a gm amplifier GM, an amplifier capacitor Ca, a first resistor r12, a second resistor r23, a third resistor r31, an oscillator OSC, a comparator CMP, and a control circuit CON.

In the step-down switching circuit 400, the amplifier capacitor Ca has one end directly connected to the feedback terminal Tout.

The step-down switching circuit 400 is different from that of the third embodiment in that the fourth resistor R4 is omitted. The omission of the fourth resistor R4 deteriorates noise characteristics but can reduce a circuit area.

Other configurations of the step-down switching circuit 400 are identical to those of the step-down switching circuit 300 according to the third embodiment in FIG. 4.

The step-down switching circuit 400 according to the fourth embodiment operates like the step-down switching circuit 300 according to the third embodiment.

Specifically, the step-down switching circuit according to the fourth embodiment can improve load response with higher speeds as in the third embodiment.

These embodiments are merely exemplary and thus do not limit the scope of the invention.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A step-down switching circuit comprising:
    a first switch element having a first end connected to an input terminal supplied with a power supply voltage and a second end connected to a switch terminal connectable to an inductor between the switch terminal and a feedback terminal;
    a second switch element having a first end connected to the second end of the switch terminal and a second end connected to a ground terminal;
    an amplifier having a first input supplied with a reference voltage;
    an amplifier capacitor having a first end connected to the feedback terminal and a second end connected to a second input of the amplifier;
    a first resistor having a first end connected to the first end of the amplifier capacitor;
    a second resistor having a first end connected to a second end of the first resistor and a second end connected to an output of the amplifier;
    a third resistor having a first end connected to the second end of the first resistor and a second end connected to the second end of the amplifier capacitor;
    an oscillator that outputs a voltage of a triangular wave;
    a comparator that receives the voltage of the triangular wave and a voltage of an amplifier signal from the amplifier and outputs a comparison signal of the voltages; and
    a control circuit that complementarily turns on/off the first switch element and the second switch element based on the comparison signal outputted from the comparator.

2. The step-down switching circuit according to claim 1, wherein in the case where the voltage of the amplifier signal is equal to or higher than the reference voltage, the control circuit reduces on duty of the first switch element and increases on duty of the second switch element as the voltage of the amplifier signal approaches the reference voltage, and
    in the case where the voltage of the amplifier signal is lower than the reference voltage, the control circuit increases the on duty of the first switch element and reduces the on duty of the second switch element as the voltage of the amplifier signal approaches the reference voltage.

3. The step-down switching circuit according to claim 1, further comprising a fourth resistor connected between the first end of the amplifier capacitor and the feedback terminal.

4. The step-down switching circuit according to claim 2, further comprising a fourth resistor connected between the first end of the amplifier capacitor and the feedback terminal.

5. The step-down switching circuit according to claim 1, wherein the oscillator generates the triangular wave based on the power supply voltage.

6. The step-down switching circuit according to claim 2, wherein the oscillator generates the triangular wave based on the power supply voltage.

7. The step-down switching circuit according to claim 5, wherein the triangular wave has an amplitude proportionate to the power supply voltage.

8. The step-down switching circuit according to claim 6, wherein the triangular wave has an amplitude proportionate to the power supply voltage.

9. The step-down switching circuit according to claim 7, wherein the amplitude of the triangular wave is a half of an amplitude of the power supply voltage.

10. The step-down switching circuit according to claim 8, wherein the amplitude of the triangular wave is a half of an amplitude of the power supply voltage.

11. A step-down switching circuit comprising:
    a first switch element having a first end connected to an input terminal supplied with a power supply voltage and a second end connected to a switch terminal connectable to an inductor between the switch terminal and a feedback terminal;
    a second switch element having a first end connected to the second end of the switch terminal and a second end connected to a ground terminal;
    an amplifier having a first input supplied with a reference voltage;
    an amplifier capacitor having a first end connected to the feedback terminal and a second end connected to a second input of the amplifier;
    a first resistor having a first end connected to the second end of the amplifier capacitor and a second end connected to an output of the amplifier;
    a second resistor having a first end connected to the first end of the amplifier capacitor and a second end connected to the second end of the amplifier capacitor;
    a third resistor having a first end connected to the first end of the second resistor and a second end connected to the second end of the first resistor;
    an oscillator that outputs a voltage of a triangular wave;
    a comparator that receives the voltage of the triangular wave and a voltage of an amplifier signal from the amplifier and outputs a comparison signal of the voltages; and
    a control circuit that complementarily turns on/off the first switch element and the second switch element based on the comparison signal outputted from the comparator.

12. The step-down switching circuit according to claim 11, wherein in the case where the voltage of the amplifier signal is equal to or higher than the reference voltage, the control circuit reduces on duty of the first switch element and increases on duty of the second switch element as the voltage of the amplifier signal approaches the reference voltage, and
    in the case where the voltage of the amplifier signal is lower than the reference voltage, the control circuit increases the on duty of the first switch element and reduces the on duty of the second switch element as the voltage of the amplifier signal approaches the reference voltage.

13. The step-down switching circuit according to claim 11, further comprising a fourth resistor connected between the first end of the amplifier capacitor and the feedback terminal.

14. The step-down switching circuit according to claim 12, further comprising a fourth resistor connected between the first end of the amplifier capacitor and the feedback terminal.

15. The step-down switching circuit according to claim 11, wherein the oscillator generates the triangular wave based on the power supply voltage.

16. The step-down switching circuit according to claim 12, wherein the oscillator generates the triangular wave based on the power supply voltage.

17. The step-down switching circuit according to claim 15, wherein the triangular wave has an amplitude proportionate to the power supply voltage.

18. The step-down switching circuit according to claim 16, wherein the triangular wave has an amplitude proportionate to the power supply voltage.

19. The step-down switching circuit according to claim 17, wherein the amplitude of the triangular wave is a half of an amplitude of the power supply voltage.

20. The step-down switching circuit according to claim 18, wherein the amplitude of the triangular wave is a half of an amplitude of the power supply voltage.

* * * * *